April 10, 1956   M. A. ELLIOTT   2,741,498
SOCKETED METALLIC TUBE JOINT OF DIFFERENT MATERIALS
Filed March 10, 1953
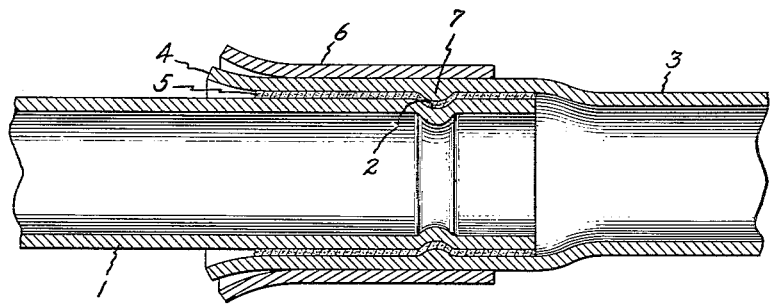
Inventor:
Marvel A. Elliott,
by
His Attorney.

United States Patent Office 2,741,498
Patented Apr. 10, 1956

2,741,498

SOCKETED METALLIC TUBE JOINT OF DIFFERENT MATERIALS

Marvel A. Elliott, Erie, Pa., assignor to General Electric Company, a corporation of New York Application March 10, 1953, Serial No. 341,578

1 Claim. (Cl. 285—161)

My invention relates to tube joints and pertains more particularly to a method of and means for joining the ends of tubes formed of materials of different hardnesses.

In the manufacture of some products such as refrigerating systems, it is desirable to join an end of a first tube which might be formed of steel or another material of similar hardness with an end of a second tube of a material of less hardness such as aluminum or the like. Heretofore, this has been accomplished by butt welding the ends of the tubes. This, however, has proved costly and a substantially difficult operation to carry out in assembly line production.

Accordingly, the primary object of my invention is to provide a new and improved means and method for joining the ends of tubes formed of materials of different hardnesses.

Another object of my invention is to provide a new and improved leak-proof mechanical tube joint.

Another object of my invention is to provide in a mechanical tube joint for tube formed of different materials means for cancelling differences in linear expansion due to differences in coefficients of expansion of the dissimilar materials.

Another object of my invention is to provide with a mechanical tube joint including a seal means for relieving the seal of strains thereby to minimize adverse effects on the seal.

Still another object of my invention is to provide a tube joint which is simple and inexpensive to construct and reliable in service.

Further objects and advantages of my invention will become apparent as the following description proceeds and the features of novelty which characterize my invention will be pointed out with particularity in the claim annexed to and forming part of this specification.

In carrying out the objects of my invention, I provide a first tube formed with an annular indentation adjacent one end. Fitted closely over this end of the first tube is an end of a second tube formed of a material of less hardness than that of the first tube. Provided between the tubes is a seal formed of a sealing compound adhesive to the materials of both tubes. Press fitted over the end of the second tube and forcing an internal annular portion of the second tube into the annular indentation in the first tube is a sleeve formed of the same material as the first tube.

For a better understanding of my invention, reference may be had to the accompanying drawing in which is illustrated a preferred embodiment of my invention.

Referring to the drawing, I have shown a first tube 1 formed of steel or any other similarly hard material. Formed adjacent an open end of the tube 1 is an annular indentation or groove 2. While I prefer forming the annular indentation 2 by rolling, it will be seen that any other suitable method is employable for this purpose.

Closely fitted over the end of the first tube 1 is an end of a second tube 3 formed of a material of less hardness than that of the first tube such as aluminum or the like. When tubes of substantially the same diameter are joined, the end portion 4 of the second tube 3 may be flared in the manner shown in the drawing. Provided between the tubes and designated 5 is a seal formed by a sealing compound adhesive to the materials of both tubes such as epoxy-resin. The seal 5 extends from the end of the first tube to a point substantially inward of the annular indentation 2.

Press fitted over the end 4 of the second tube 3 is a sleeve 6 formed of the same material as the first tube 1, such as steel. The sleeve 6 forces into and retains in the annular indentation 2 in the relatively harder first tube an annular internal portion 7 of the softer second tube 3, in the manner shown in the drawing.

It will be seen that in my just-described tube joint the seal 5 insures a leak-proof joint and the cooperation of the annular internal portion 7 of the second tube 3 and the annular indentation 2 in the first tube 1 increases the mechanical strength of the joint. Additionally, it provides for direct transfer of strains from one tube to the other thereby relieving strain on the seal 5 and minimizing adverse effects on the seal. It will also be seen that while in my arrangement the different materials will have different coefficients of expansion, the disposition of the tube of softer material between the tube and the sleeve of harder material will result in substantial cancellation of differences in expansion. Thus, no excessive differences in linear expansion and resulting strain at the joint will be encountered.

In constructing my joint, I prefer first to form the annular indentation 2 in the first or harder tube 1 adjacent the open end thereof. Then I coat the end of the harder tube to a point substantially inward of the annular indentation 2 with any suitable sealing compound which is adhesive to the materials of both the harder tube 2 and of the second or softer tube 3 such as epoxy-resin. Thereafter, I press the end of the softer tube 3 over the coated end of the harder tube and also beyond the annular indentation 2. It has been my experience that the most satisfactory joint is obtained when the initial clearance between the first and second tubes is between approximately .005 of an inch and zero. This I attribute to the fact that with such a small clearance the final thickness of the seal 5 is practically zero, which is desirable from strength and leakproofing standpoints. After having press fitted the softer tube 3 on the end of the harder tube 1, I press fit the sleeve 6, which is also harder than the second tube 3 and preferably formed of the same material as the harder tube on the end of the softer tube. This causes the annular internal portion 7 of the softer tube to flow or be forced into the annular indentation 2 in the harder tube 1 and to be retained therein for the purposes mentioned above.

While I have shown and described a specific embodiment of my invention, I do not desire my invention to be limited to the particular form shown and described, and I intend by the appended claim to cover all modifications within the spirit and scope of my invention.

What I claim as new and desire to secure by Letters Patent of the United States is:

A tube joint comprising a steel tube formed to include an annular indentation adjacent an open end thereof, an aluminum tube closely fitted over said open end of said steel tube and said annular indentation, a seal between said tubes formed by a sealing compound adhesive to steel and aluminum, and a steel sleeve press fitted over said end of said aluminum tube, said sleeve forcing into and retaining in said annular indentation in said steel tube an annular internal portion of said aluminum tube for increasing the strength of said joint and relieving strain on said seal.

(References on following page)

References Cited in the file of this patent

UNITED STATES PATENTS

| | | |
|---|---|---|
| 1,157,997 | Meeks | Oct. 26, 1915 |
| 1,877,433 | Ten Brook | Feb. 9, 1931 |
| 2,252,299 | McCoy | Aug. 12, 1941 |
| 2,322,587 | Payne | June 22, 1943 |
| 2,498,831 | Veitch | Feb. 28, 1950 |
| 2,512,996 | Bixler | June 27, 1950 |
| 2,623,837 | Butler | Dec. 30, 1952 |

FOREIGN PATENTS

| | | |
|---|---|---|
| 660,065 | Germany | Aug. 2, 1932 |
| 447,094 | Great Britain | May 12, 1936 |
| 450,906 | Great Britain | July 17, 1936 |